(12) United States Patent
Isoda et al.

(10) Patent No.: US 11,641,175 B2
(45) Date of Patent: May 2, 2023

(54) CONTROLLER FOR ROTARY ELECTRIC MACHINE

(71) Applicant: Mitsubishi Electric Corporation, Tokyo (JP)

(72) Inventors: Hitoshi Isoda, Tokyo (JP); Shinsuke Kayano, Tokyo (JP); Kengo Kumagai, Tokyo (JP); Noriyuki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 23 days.

(21) Appl. No.: 17/342,795

(22) Filed: Jun. 9, 2021

(65) Prior Publication Data

US 2022/0069760 A1 Mar. 3, 2022

(30) Foreign Application Priority Data

Sep. 2, 2020 (JP) .............................. JP2020-147236

(51) Int. Cl.
*H02P 29/64* (2016.01)
*G01K 13/08* (2006.01)
*H02P 29/66* (2016.01)

(52) U.S. Cl.
CPC .............. *H02P 29/64* (2016.02); *G01K 13/08* (2013.01); *H02P 29/662* (2016.11)

(58) Field of Classification Search
CPC ........ H02P 29/64; H02P 26/662; G01K 13/08
See application file for complete search history.

(56) References Cited

U.S. PATENT DOCUMENTS

| | | | | |
|---|---|---|---|---|
| 7,129,660 B2* | 10/2006 | Fujita | ...................... | H02P 21/16 318/434 |
| 2014/0126606 A1* | 5/2014 | Ito | ......................... | G01K 7/427 374/163 |
| 2014/0354204 A1* | 12/2014 | Tachibana | ................. | H02P 6/10 318/473 |
| 2015/0022126 A1* | 1/2015 | Schulz | .................... | H02P 29/60 318/400.02 |
| 2015/0263509 A1* | 9/2015 | Senoo | .................... | G01K 13/00 318/473 |
| 2016/0036359 A1* | 2/2016 | Nagata | .................... | H02P 29/62 318/400.1 |

FOREIGN PATENT DOCUMENTS

JP 2008-245412 A 10/2008

* cited by examiner

*Primary Examiner* — Rina I Duda
(74) *Attorney, Agent, or Firm* — Sughrue Mion, PLLC; Richard C. Turner (57) ABSTRACT

A controller for a rotary electric machine may include: at least one memory that stores a temperature prediction data in which a relationship among a rotational speed of a rotary electric machine, a torque information of the rotary electric machine, a temperature of the rotary electric machine at a reference time point, and a temperature of the rotary electric machine after an estimation calculation period elapses from the reference time point, and at least one processor that, at every estimation calculation period, sets the last calculation time before the estimation calculation period as the reference time point, and, by referring to the temperature prediction data, calculates an estimation value of temperature of the rotary electric machine after the estimation calculation period elapses from the last calculation time.

9 Claims, 10 Drawing Sheets

CONTROLLER FOR ROTARY ELECTRIC MACHINE

INCORPORATION BY REFERENCE

The disclosure of Japanese Patent Application No. 2020-147236 filed on Sep. 2, 2020 including its specification, claims and drawings, is incorporated herein by reference in its entirety.

BACKGROUND

The present disclosure relates to a controller for AC rotary electric machine.

A rotary electric machine is provided with a stator having a stator core where the stator coil wound around, and a rotor disposed at the radial-direction inner side of the stator. The rotary electric machine functions as a motor or a generator, when current flows into the stator coil. When current flows into the stator coil, the stator coil, the stator core, the rotor core and the like generate heat due to the copper loss, the iron loss, and the like. When the temperature of the stator rises by this generation of heat, failure of the stator coil may occur. When the temperature of the permanent magnet provided in the rotor rises, performance degradation, such as heat demagnetization, may occur.

A temperature sensor is attached to the stator coil, the temperature of the stator coil is detected, and overheat protection of the rotary electric machine is performed. However, when the heating amount of the stator coil is large and the temperature rise is steep, the detection by the temperature sensor may be delayed. Since the number of temperature sensors and the part where the temperature sensor can be attached have limitation, especially when the attach point of the temperature sensor is distant from the rise part of temperature, the detection delay by the temperature sensor becomes large.

JP 2008-245412 A discloses the technology of estimating the temperature of the stator coil, without using the temperature sensor. In the technology of JP 2008-245412 A, by referring the contour line map of the saturation temperature of the stator coil in which the rotational speed and the torque of the rotary electric machine are used as parameters, the current operating point on the map corresponding to the present rotational speed and the present torque is calculated. And, when the contour line crosses between the last time operating point and the current operating point, the deviation is calculated, and the temperature of the stator coil is estimated based on the deviation.

SUMMARY

However, when the operating point of the rotational speed and the torque of the rotary electric machine changes, the heating amount and the heat radiation amount of each part of the rotary electric machine change, and the temperature of the rotary electric machine changes with response delay due to the heat capacity. That is to say, after the operating point of the rotary electric machine changes, the temperature of the rotary electric machine does not immediately change to the saturation temperature which is the temperature in steady state, but changes with delay.

In the technology of JP 2008-245412 A, since estimation is performed using the contour line map of the saturation temperature, the transitional temperature change cannot be estimated with good accuracy.

By the way, it is also considered to estimate the temperature of the rotary electric machine by simulation calculation using the heating amount of each part, the heat radiation amount of each part, and the heat capacity of each part. However, in case of the rotary electric machine, the heating amount is generated not only by the copper loss according to current of the stator coil, but also by the iron loss due to the stator core and the rotor core. The iron loss changes according to the rotational speed and the dq-axis currents. The heat radiation amount by the cooling mechanism of the rotary electric machine changes according to the rotational speed and the temperature of the rotary electric machine. Therefore, in case of the rotary electric machine, the Heating amount and the heat radiation amount largely change according to the operating point of rotational speed and torque, and the transitional behavior does not become a simple first order lag, but changes according to the operating point of rotational speed and torque.

Therefore, in order to estimate the temperature of the rotary electric machine with good accuracy by simulation calculation using the heating amount of each part, the heat radiation amount of each part, and the heat capacity of each part, complicated calculation is necessary, and it is not easy to calculate the transitional behavior with good accuracy by simple calculation.

Then, the purpose of the present disclosure is to provide a controller for rotary electric machine which can estimate a transitional temperature of the rotary electric machine with good accuracy, while considering the heating amount and the heat radiation amount of each part of the rotary electric machine due to the copper loss and the iron loss which change according to the operating point of the rotational speed and the torque of the rotary electric machine, and suppressing the increase in arithmetic load.

A controller for AC rotary electric machine according to the present disclosure,
  at calculation timing of every preliminarily set estimation calculation period,
  by referring to a temperature prediction data in which a relationship among a rotational speed of a rotary electric machine, a torque information of the rotary electric machine, a temperature of the rotary electric machine at a reference time point, and a temperature of the rotary electric machine after lapse of the estimation calculation period from the reference time point,
  calculates an estimation value of temperature of the rotary electric machine after lapse of the estimation calculation period from the last time calculation timing, corresponding to the present rotational speed of the rotary electric machine, the present torque information of the rotary electric machine, and the estimation value of temperature of the rotary electric machine calculated at the last time calculation timing.

According to the controller for AC rotary electric machine of the present disclosure, since in the temperature prediction data, the transitional behavior of the temperature before and after the estimation calculation period in each operating point of the rotational speed and the torque is preliminarily set, by performing simple processing which referrers to the temperature prediction data and calculates the estimation value of temperature at the present calculation timing corresponding the operating point of the present rotational speed and the present torque and the estimation value of temperature at the last time calculation timing, the calculate value of temperature can be estimated successively, without performing complicated simulation calculation. Since the influence of the heat radiation amount, and the heating amount due to the copper loss and the iron loss which change according to the operating point of the rotational speed, the torque, and the temperature is previously set to the temperature prediction data, steady and transitional temperature can be estimated with good accuracy in each operating point.

DETAILED DESCRIPTION OF THE EMBODIMENTS

1. Embodiment 1

Figure 1:
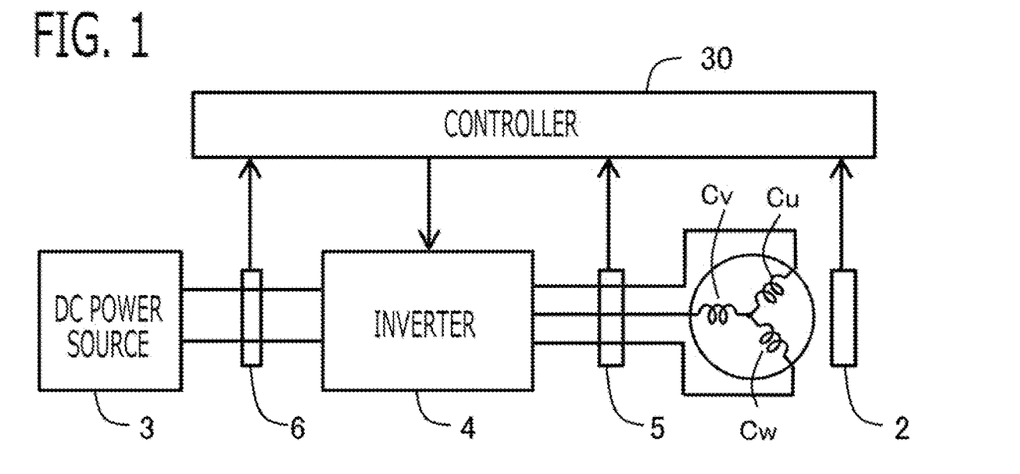
FIG. 1 is a schematic configuration diagram of the rotary electric machine and the controller for rotary electric machine according to Embodiment 1.

A controller 30 for rotary electric machine (hereinafter, referred to simply as the controller 30) according to Embodiment 1 will be explained with reference to drawings. FIG. 1 is a schematic configuration diagram of a rotary electric machine 1, an inverter 4, the controller 30, and the like.

1-1. Rotary Electric Machine 1

Figure 2:
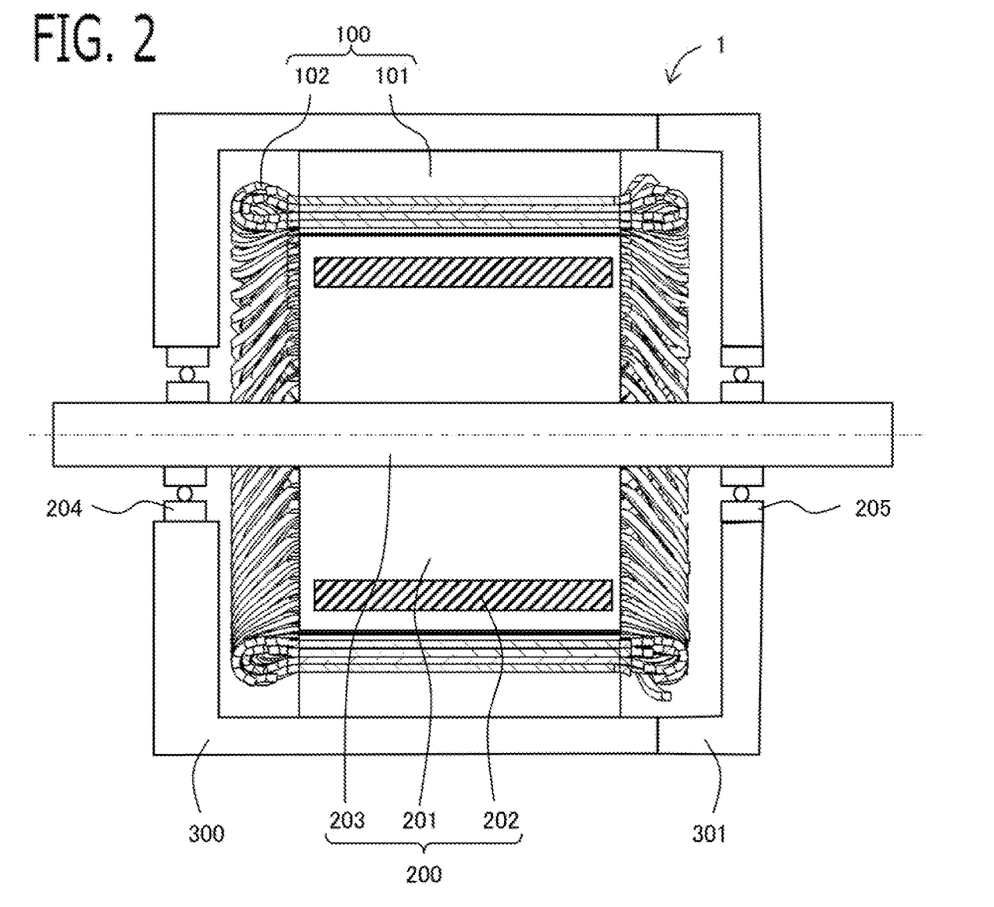
FIG. 2 is a schematic cross-sectional view of the rotary electric machine according to Embodiment 1.

FIG. 2 shows a cross-sectional view of the rotary electric machine 1 cut at a plane passing a rotation axial center. The rotary electric machine 1 is provided with a cylindrical tubular stator 100, and a cylindrical tubular rotor 200 which is disposed at the radial-direction inner side of the stator 100 and is rotatably supported by the bearings 204, 205. In the present embodiment, the rotary electric machine 1 is a permanent magnet synchronous motor, the coil 102 is wound around the stator 100, and the permanent magnet 202 is provided in the rotor 200. The rotary electric machine 1 may be a field coil type synchronous motor in which the field coil is provided in the rotor. Alternatively, the rotary electric machine 1 may be an induction motor in which the cage type electric conductor is provided in the rotor.

The stator 100 is provided with a stator core 101 in which annular-disk electromagnetic steel plates are laminated in the axial direction, and coil 102 wound around each teeth of the stator core 101. Plural teeth are provided in the circumferential direction at the equivalent interval. The coil 102 has the coil end parts projected on both sides in the axial direction from the stator core 101. The coils of plural phases are provided as the coil 102 (in this example, the coils Cu, Cv, Cw of the three-phase of U phase, V phase, and W phase), and the end of the coil of each phase is connected to the inverter 4. Plural pairs of the coils of three-phases (for example, two pairs) may be provided.

The rotor 200 is provided with a rotor core 201 in which annular-disc electromagnetic steel plates are laminated in the axial direction, permanent magnets 202 equipped in each slot of the rotor core 201, and the rotation axis 203 fixed to the inner circumferential face of the rotor core 201. The permanent magnet 202 may be fixed to the outer circumferential face of the rotor core 201.

The stator 100 and the rotor 200 are housed within a housing. As the housing, a bottomed cylindrical tubular first housing 300 with deep bottom, and a bottomed cylindrical tubular second housing 301 with shallow bottom which closes the opening of the first housing 300 are provided. The stator 100 (the stator core 101) is fixed to the inner circumferential face of the circumferential wall of the first housing 300. Each of the bottom wall of the first housing 300 and the bottom wall of the second housing 301 is provided with a through hole which a rotation axis 203 penetrates. The inner circumferential face of the through hole of the bottom wall of the first housing 300 rotatably supports the axial direction one side of the rotation axis 203 via the first bearing 204. The inner circumferential face of the through hole of the bottom wall of the second housing 301 rotatably supports the other side of the axial direction of the rotation axis 203 via the second bearing 205.

Various kinds of cooling mechanisms are used for the cooling mechanism of the rotary electric machine 1. For example, the oil cooling type that cooling oil is supplied in the housing and the stator and the rotor are cooled, the water cooling type that the housing and the stator are cooled by cooling water, or the air cooling type that the stator and the rotor are cooled by cooling air is used.

The rotary shaft 203 is provided with a rotation sensor 2 for detecting a rotational angle of the rotator 200. Resolver, encoder, or MR sensor is used for the rotation sensor 2. An output signal of the rotation sensor 2 is inputted into the controller 30.

1-2. Inverter 4

Figure 3:
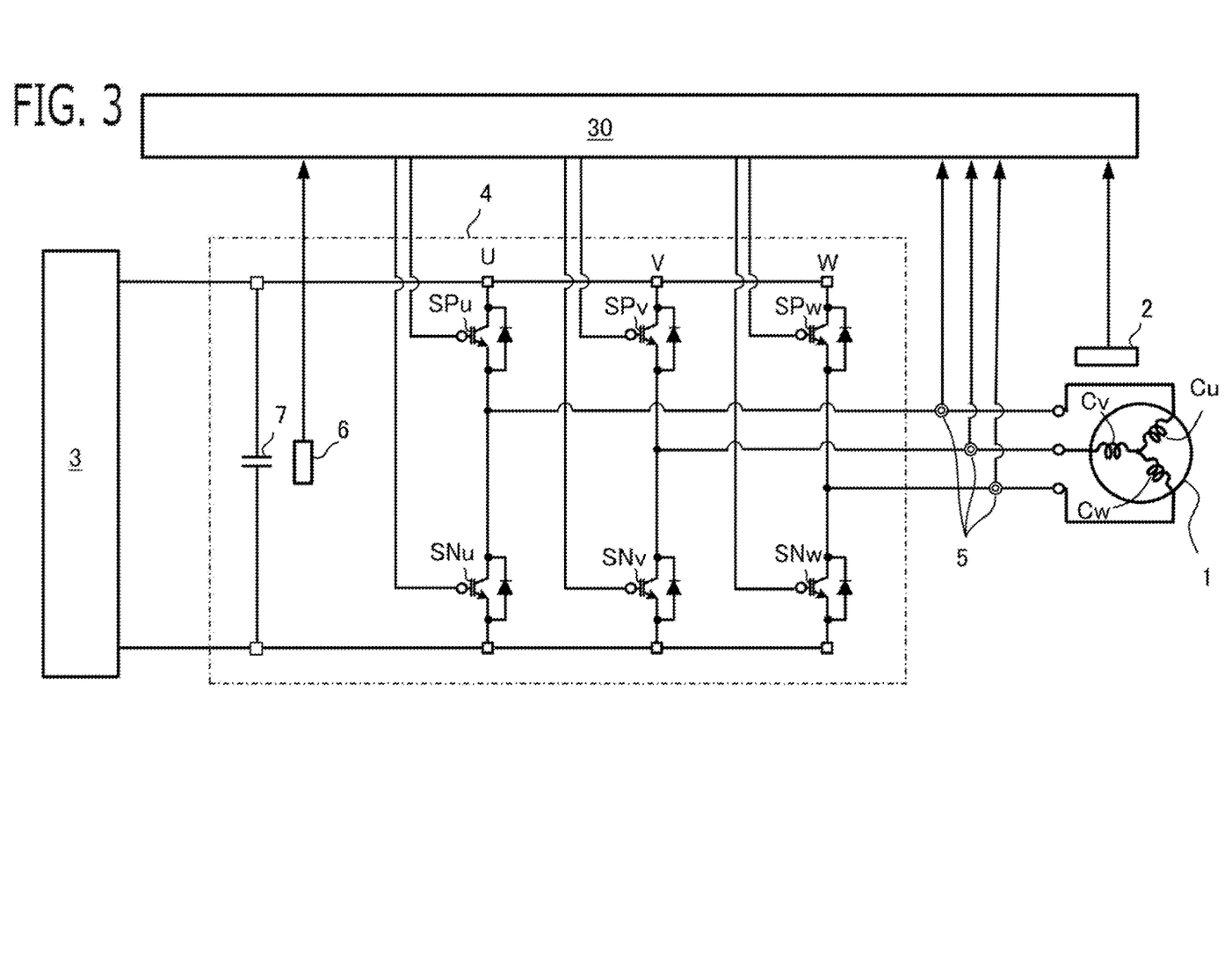
FIG. 3 is a schematic circuit diagram of the inverter according to Embodiment 1.

As shown in FIG. 3, the inverter 4 is provided with three sets of a series circuit (leg) where a positive electrode side switching device SP connected to a positive electrode side of the DC power source 3 and a negative electrode side switching device SN connected to a negative electrode side of the DC power source 3 are connected in series, corresponding to respective phase of three-phase. A connection node of two switching devices in each phase series circuit is connected to the coil of the corresponding phase.

Specifically, in the series circuit of U phase, the positive electrode side switching device SPu of U phase and the negative electrode side switching device SNu of U phase are connected in series, and the connection node of two switching devices is connected to the coil Cu of U phase. In the series circuit of V phase, the positive electrode side switching device SPv of V phase and the negative electrode side switching device SNv of V phase are connected in series, and the connection node of two switching devices is connected to the coil Cv of V phase. In the series circuit of W phase, the positive electrode side switching device SPw of W phase and the negative electrode side switching device SNw of W phase are connected in series, and the connection node of two switching devices is connected to the coil Cw of W phase. A smoothing capacitor 7 is connected between the positive electrode side and the negative electrode side of the DC power source 3.

FET (Field Effect Transistor) in which a diode is connected in reversely parallel, IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 30 via a gate drive circuit and the like. The each switching device is turned on or turned off by the switching signal outputted from the controller 30.

The DC power source 3 outputs a DC voltage Vdc to the inverter 4. The DC power source 3 may be any apparatus which outputs DC voltage, such as a battery, a DC-DC converter, a diode rectifier, and a PWM rectifier. A voltage sensor 6 which detects the DC voltage Vdc of the DC power source 3 is provided in the DC power source 3. An output signal of the voltage sensor 6 is inputted into the controller 30.

A current sensor 5 which detects current which flows into the coil of each phase is provided. The current sensor 5 is provided on a wire which connects the series circuit of two switching devices of each phase, and the coil of each phase. An output signal of the current sensor 5 is inputted into the controller 30. The current sensor 5 may be provided in the series circuit of two switching devices of each phase.

1-3. Controller 30

Figure 4:
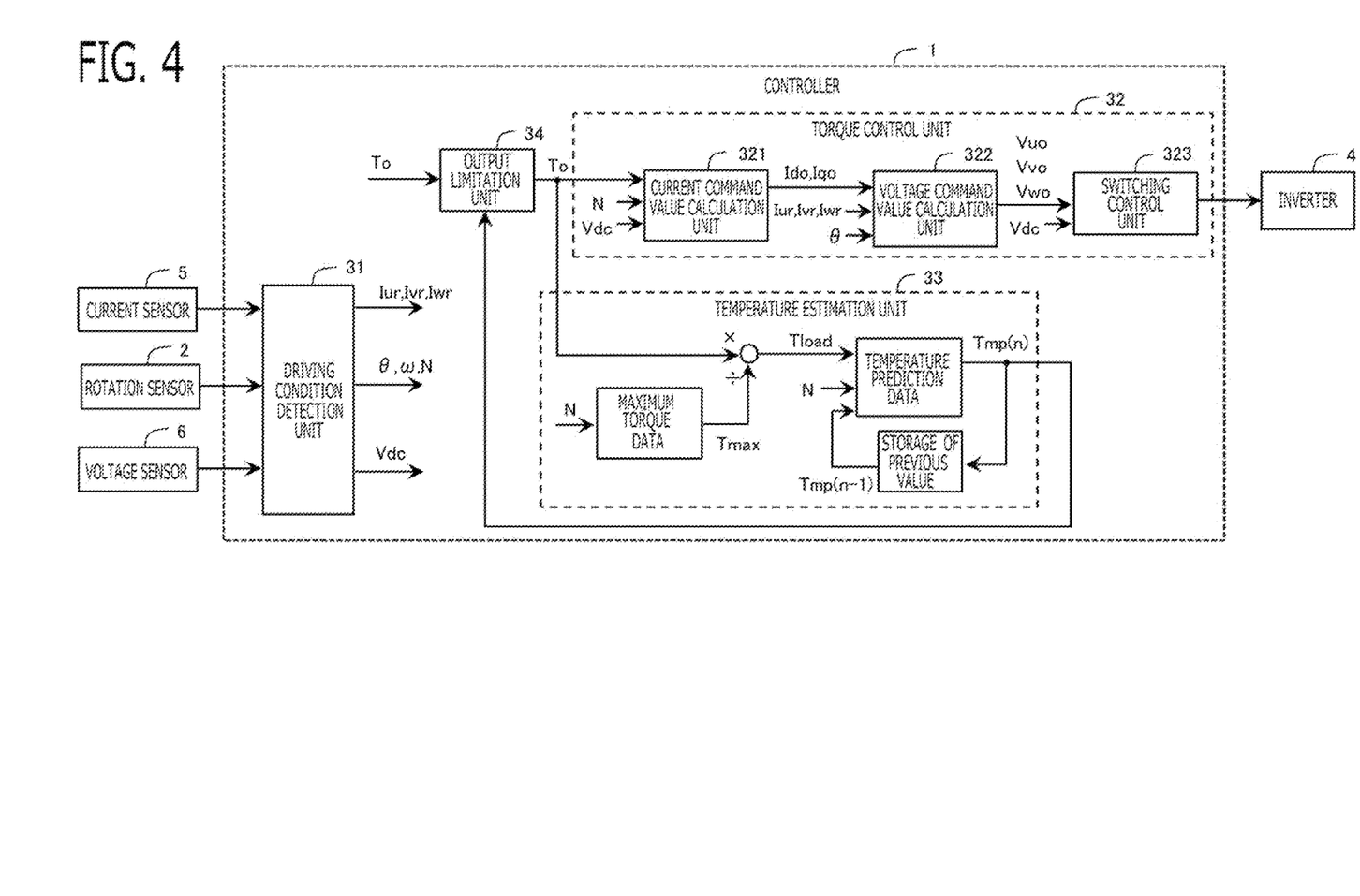
FIG. 4 is a schematic block diagram of the controller for rotary electric machine according to Embodiment 1.
Figure 5:
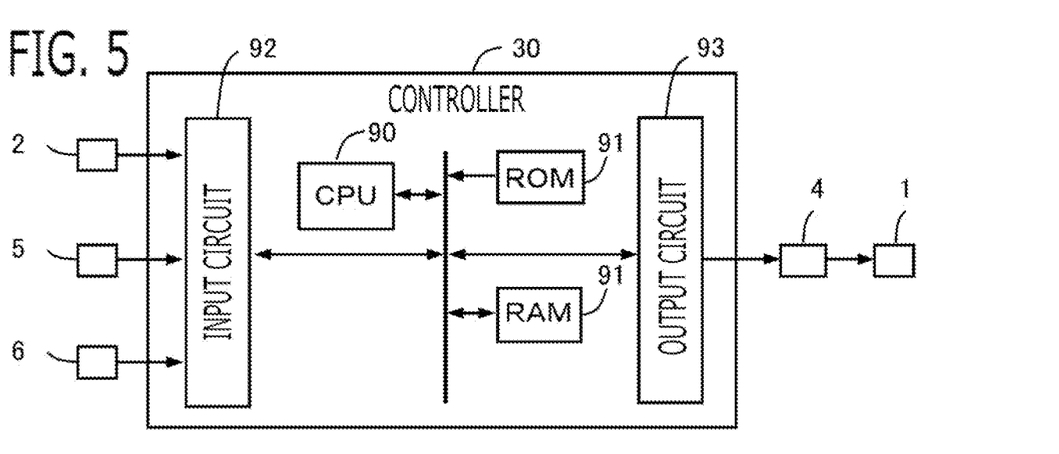
FIG. 5 is a schematic hardware configuration diagram of the controller for AC rotary machine according to Embodiment 1.

The controller 30 controls the rotary electric machine 1 via the inverter 4. As shown in FIG. 4, the controller 30 is provided with a driving condition detection unit 31, a torque control unit 32, a temperature estimation unit 33, an output limitation unit 34, and the like. Each function of the controller 30 is realized by processing circuits provided in the controller 30. Specifically, as shown in FIG. 5, the controller 30 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the rotation sensor 2, the current sensor 5, and the voltage sensor 6, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 34 included in the controller 50 are realized. Setting data items such as temperature prediction data, maximum torque data, and torque reduction rate data to be used in the control units 31 to 34 are stored, as part of software items (programs), in the storage apparatus 91 such as a ROM. Each function of the controller 30 will be described in detail below.

1-3-1. Driving Condition Detection Unit 31

The driving condition detection unit 31 detects a magnetic pole position $\theta$ (a rotational angle $\theta$ of the rotor) and a rotational angle speed $\omega$ of the rotor in the electrical angle. In the present embodiment, the driving condition detection unit 31 detects the rotational angle $\theta$ (a magnetic pole position $\theta$) and the rotational angle speed $\omega$ of the rotor based on the output signal of the rotation sensor 2. The magnetic pole position $\theta$ (the rotational angle $\theta$) is set to the direction of the N pole of the permanent magnet provided in the rotor. The driving condition detection unit 31 calculates a rotational speed N [rpm] in the mechanical angle by multiplying a predetermined conversion constant to the rotational angle speed $\omega$ [rad/s] in the electrical angle. The driving condition detection unit 31 may estimate the rotational angle (the magnetic pole position) without using the rotation sensor, based on current information which are obtained by superimposing a harmonic wave component on the current command value (so-called, sensorless system).

The driving condition detection unit 31 detects the currents Iur, Ivr, Iwr which flow into respective three-phase coils, based on the output signal of the current sensor 5. The driving condition detection unit 31 detects the DC voltage Vdc supplied to the inverter 4, based on the output signal of the voltage sensor 6.

1-3-2. Torque Control Unit 32

The torque control unit 32 controls the voltage applied to the three-phase coils of the rotary electric machine 1, and controls the torque of the rotary electric machine 1. In the present embodiment, the torque control unit 32 is provided with a current command value calculation unit 321, a voltage command value calculation unit 322, and a switching control unit 323.

The current command value calculation unit 321 calculates a current command value based on a torque command value To, the rotational speed N, and the DC voltage Vdc. In the present embodiment, the current command value calculation unit 321 calculates a d-axis current command value Ido and a q-axis current command value Iqo. A d-axis is defined in the direction of the magnetic pole (the N pole, the magnetic pole position $\theta$) of the rotor, and the q-axis is defined in the direction advanced to the d-axis by 90 degrees in the electrical angle. A dq-axis rotating coordinate system rotates synchronizing with rotation of the magnetic pole position $\theta$ of the rotor. In the present embodiment, as the torque command value To, a value after processing by the output limitation unit 34 described below is used.

The current command value calculation unit 321 calculates d-axis and q-axis current command values Ido, Iqo according to well-known the vector control method, such as the maximum torque/current control, the field weakening control, and the Id=0 control. The torque command value To may be calculated inside the controller 30, and may be transmitted from the outside of the controller 30.

The voltage command value calculation unit 322 calculates three-phase voltage command values Vuo, Vvo, Vwo based on the current command value. In the present embodiment, the voltage command value calculation unit 322 performs a current feedback control that changes the d-axis and q-axis current command values Vdo, Vqo so that d-axis and q-axis current detection values Idr, Iqr approach the d-axis and q-axis current command values Ido, Iqo.

The voltage command value calculation unit 322 converts the current detection values Iur, Ivr, Iwr of three-phase coils into the d-axis current detection value Idr and the q-axis current detection value Iqr, by performing a three-phase/two-phase conversion and a rotating coordinate conversion based on the magnetic pole position θ.

Then, the voltage command value calculation unit 322 converts the d-axis and q-axis current command values Vdo, Vqo into the three-phase voltage command values Vuo, Vvo, Vwo, by performing a fixed coordinate conversion and a two-phase/three-phase conversion based on the magnetic pole position θ, The switching control unit 323 applies voltage to the three-phase coils, by controlling on/off the switching devices which the inverter 4 has by PWM control (Pulse Width Modulation) based on the three-phase voltage command values Vuo, Vvo, Vwo. The switching control unit 323 controls on/off plural switching devices, by comparing each of the three-phase voltage command values Vuo, Vvo, Vwo and a carrier wave. The carrier wave is a triangular wave which vibrates with an amplitude of the DC voltage Vdc at a PWM period.

1-3-3. Temperature Estimation Unit 33

<Estimation Principle>

Figure 6:
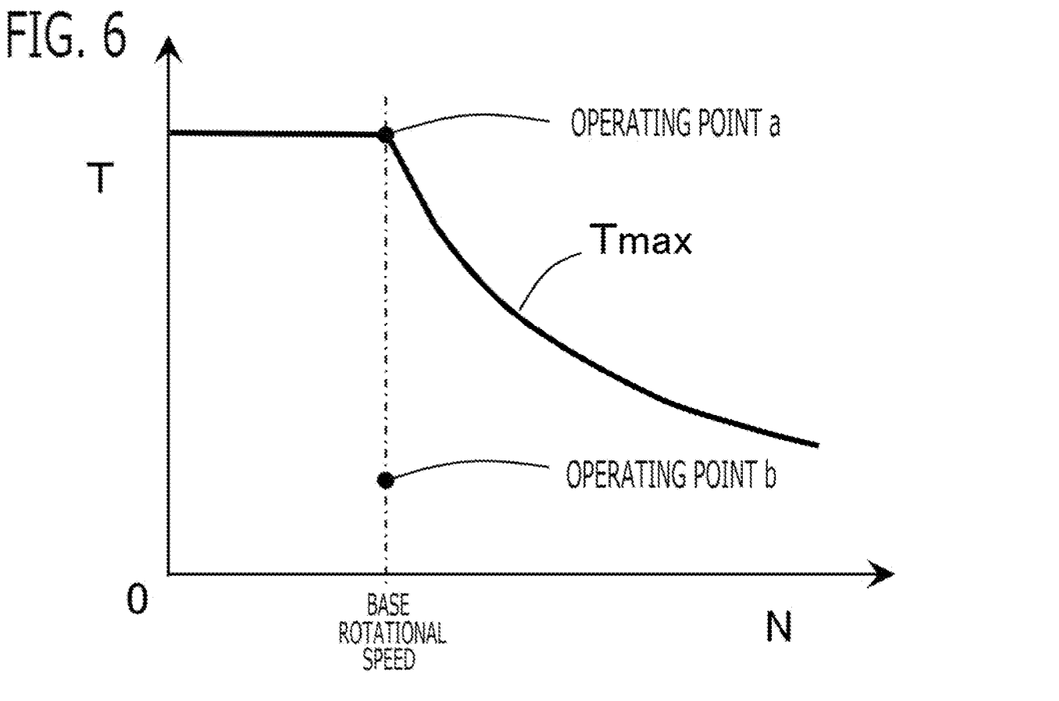
FIG. 6 is a figure for explaining the maximum torque according to Embodiment 1.

FIG. 6 shows characteristics of the maximum torque Tmax which the rotary electric machine can output in each rotational speed N. When the rotational speed N is less than or equal to a base rotational speed, the maximum torque Tmax is decided by limiting to the maximum current. When the rotational speed N is greater than or equal to the base rotational speed, the maximum torque Tmax is decided when the induced voltage which increases according to the rotational speed N is limited by the DC voltage Vdc. The torque T of the rotary electric machine is controlled within a range less than or equal to the maximum torque Tmax in each rotational speed N.

Figure 7:
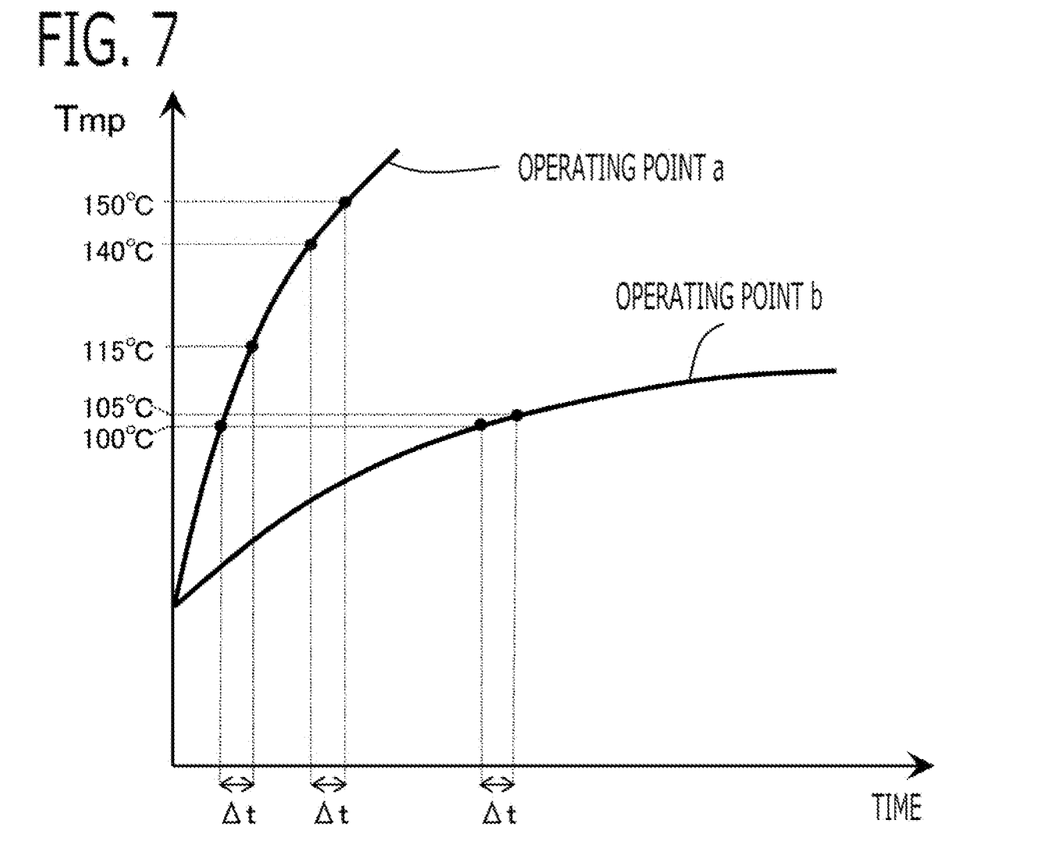
FIG. 7 is a time chart for explaining the temperature change of the rotary electric machine according to Embodiment 1.
Figure 8:
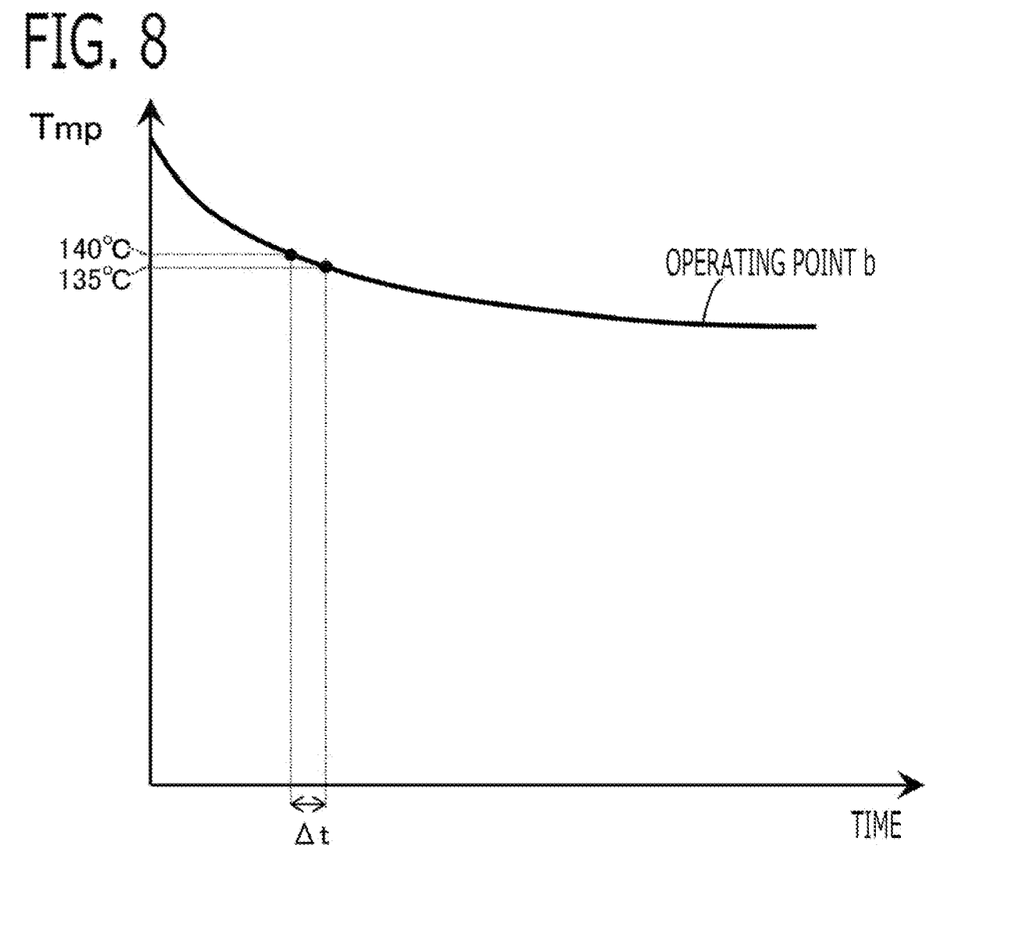
FIG. 8 is a time chart for explaining the temperature change of the rotary electric machine according to Embodiment 1.

FIG. 7 and FIG. 8 show one example of transitional temperature rising curves of the stator coil of the operating point a and the operating point b shown in FIG. 6, and a temperature falling curve of the operating point b. In the operating point a, the torque T is the maximum torque Tmax. In the operating point b, the torque T is 20% of the maximum torque Tmax. As shown in FIG. 7, in the operating point a, since the torque T is large, the current of the stator coil is large, and the heating amount of the stator coil is large, the temperature rise is steep. In the operating point b, since the torque T is small, the current of the stator coil is small, and the heating amount of the stator coil is small, the temperature rise becomes gentle. In the operating point b of FIG. 8, since the heating amount of the stator coil is small also when temperature drops, the temperature fall becomes gentle.

Generally, the change of temperature is expressed by the deviation between the heating amount and the heat radiation amount, and the heat capacity; and it becomes a first order lag behavior. However, in case of the rotary electric machine, the heating amount is generated not only by the copper loss in proportion to the current of the coil, but also by the iron loss of the core. The iron loss changes according to the rotational speed N and the dq-axis currents. The heat radiation amount by the cooling mechanism of the rotary electric machine changes according to the rotational speed N and the temperature of the rotary electric machine. Therefore, in case of the rotary electric machine, the heating amount and the heat radiation amount largely change according to the operating point of the rotational speed N and the torque T; and the transitional behavior does not become a simple first order lag, but changes according to the operating point of the rotational speed N and the torque T. The heating amount of each part and the heat radiation amount of each part change according to the operating point of the rotational speed N and the torque T, and the heat capacity of each part is also different.

Therefore, in order to estimate the temperature of the rotary electric machine with good accuracy by simulation calculation using the heating amount of each part, the heat radiation amount of each part, and the heat capacity of each part, complicated calculation is necessary, and it is not easy to calculate the transitional behavior with good accuracy by simple calculation.

On the other hand, in each operating point of the rotational speed N and the torque T, the time change of actual temperature from each temperature becomes a predetermined rising curve or falling curve. Then, in the present disclosure, by utilizing the actual temperature behavior in each operating point of the rotational speed N and the torque T, it is configured so as to estimate with good accuracy with small arithmetic load. Specifically, as shown in FIG. 7, when the temperature of the stator coil at the certain time is 100° C., the temperature of the stator coil after a predetermined period Δt changes according to the operating points; in the operating point a, the rise width of temperature becomes large; and in the operating point b, the rise width of temperature becomes small. As shown in FIG. 7 and FIG. 8, when the temperature of the stator coil at the certain time is 140° C., the temperature of the stator coil after the predetermined period Δt rises with a prescribed temperature width in the operating point a, and falls with a prescribed temperature width in the operating point b. In each operating point, it becomes a rising curve in a temperature region where the temperature is lower than the temperature of steady state, and it becomes a falling curve in a temperature region where the temperature is higher than the temperature of steady state.

<Estimation Processing>

Then, in each operating point of the rotational speed N and the torque T, the time change of actual temperature from each temperature as shown in FIG. 7 and FIG. 8 is obtained by experiment or analysis. Then, based on the obtained data of the time change of temperature, a temperature prediction data in which a relationship among the rotational speed N, a torque information, a temperature Tmp(t0) of the rotary electric machine at a reference time point t0, and a temperature Tmp(t0+Δt) of the rotary electric machine after lapse of an estimation calculation period Δt from the reference time point t0 is preliminarily set. The temperature prediction data is stored in the storage apparatus 91, such as ROM.

For example, if the experimental data of FIG. 7 is obtained, in the rotational speed N and the torque T of the operating point a, 115° C. is set as the temperature after lapse of the estimation calculation period Δt from the reference time point t0 when the temperature at the reference time point is 100° C. In the rotational speed N and the torque T of the operating point b, 105° C. is set as the temperature after lapse of the estimation calculation period Δt from the reference time point when the temperature at the reference time point is 100° C. If the experimental data of FIG. 8 is obtained, in the rotational speed N and the torque T of the operating point b, 135° C. is set as the temperature after lapse of the estimation calculation period Δt from the reference time point when the temperature at the reference time point is 140° C.

At calculation timing of every preliminarily set estimation calculation period Δt, by referring the temperature prediction data, the temperature estimation unit 33 calculates the estimation value Tmp(n) of temperature after lapse of the estimation calculation period Δt from the last time calculation timing (hereinafter, referred to as the estimation value Tmp(n) of temperature at the present calculation timing), corresponding to the present rotational speed N, the present torque information, and the estimation value Tmp (n−1) of temperature of the rotary electric machine calculated at the last time calculation timing. Herein, (n−1) expresses data at the last time calculation timing, and (n) expresses data at this time calculation timing.

According to this configuration, since in the temperature prediction data, the transitional behavior of the temperature before and after the estimation calculation period Δt in each operating point of the rotational speed N and the torque T is preliminarily set, by performing simple processing which referrers to the temperature prediction data and calculates the estimation value Tmp(n) of temperature at the present calculation timing corresponding to the operating point of the present rotational speed N and the present torque T and the estimation value Tmp (n−1) of temperature at the last time calculation timing, the estimation value Tmp of temperature can be estimated successively, without performing complicated simulation calculation. Since the influence of the heat radiation amount, and the heating amount due to the copper loss and the iron loss which change according to the operating point of the rotational speed N, the torque T, and the temperature is previously set to the temperature prediction data, steady and transitional temperature can be estimated with good accuracy in each operating point.

In the present embodiment, as the part of the rotary electric machine whose temperature is estimated, the coil provided in the stator of the rotary electric machine is set. As the part of the rotary electric machine whose temperature is estimated, the magnet provided in the rotor of the rotary electric machine may be set.

From the temperature prediction data, the temperature estimation unit 33 searches for the temperature Tmp(t0) at the reference time point corresponding to the estimation value Tmp(n−1) of temperature of the rotary electric machine calculated at the last time calculation timing, the rotational speed N corresponding to the present rotational speed N, and the torque information corresponding to the present torque information. And, the temperature estimation unit 33 calculates the temperature Tmp(t0+Δt) of the rotary electric machine after lapse of the estimation calculation period Δt from the reference time point t0, which is set corresponding to the searched temperature Tmp(t0) at the reference time point, the searched rotational speed N, and the searched torque information, as the estimation value Tmp(n) of temperature after lapse of the estimation calculation period Δt from the last time calculation timing.

Figure 9:
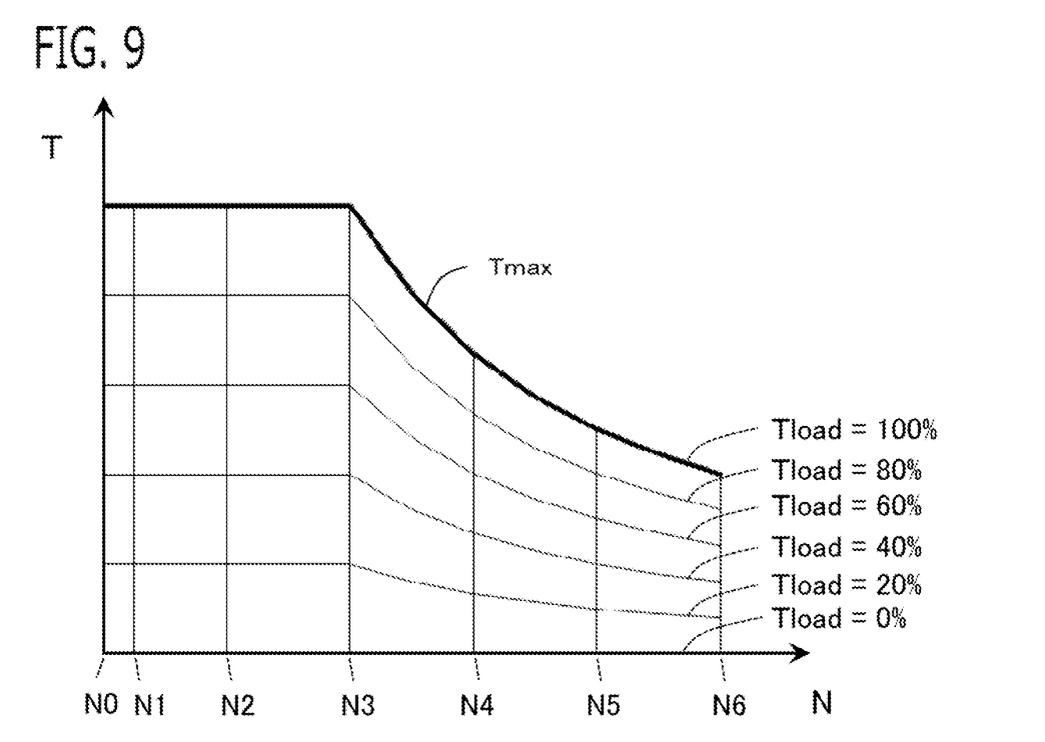
FIG. 9 is a figure for explaining setting of the temperature prediction data according to Embodiment 1.
Figure 10:
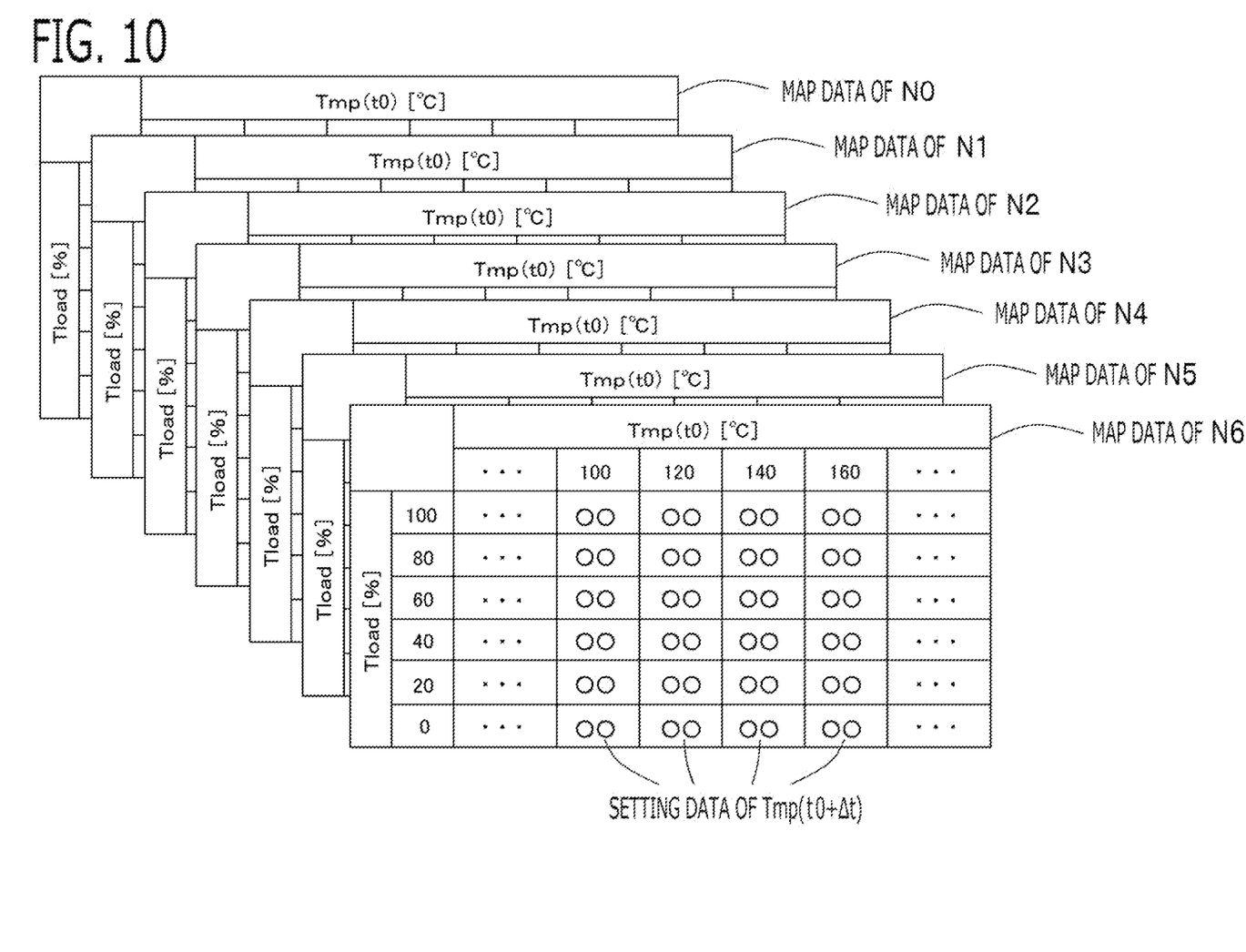
FIG. 10 is a figure for explaining setting of the temperature prediction data at every reference rotational speed according to Embodiment 1.

In the present embodiment, as the torque information, a torque load rate Tload (=T/Tmax×100%) which is a ratio of the torque T of the rotary electric machine with respect to the maximum torque Tmax capable of being outputted in the corresponding rotational speed N is used. By using the torque load rate Tload, as shown in FIG. 9 and FIG. 10, even when the rotational speed N is greater than or equal to the base rotational speed, data can be set using the same map axis of the torque load rate Tload, and the setting range and the practical range of data can be coincided. As the torque information, the torque T may be used.

By referring to a maximum torque data in which a relationship between the rotational speed N and the maximum torque Tmax is preliminarily set as shown in FIG. 6, the temperature estimation unit 33 calculates the maximum torque Tmax corresponding to the present rotational speed N. Then, the temperature estimation unit 33 calculates the present torque load rate Tload by dividing the present torque T by the calculated maximum torque Tmax. As the present torque T, the torque command value To may be used, or the actual torque value calculated based on the dq-axis current detection values and the rotational speed N using the well-known torque calculation equation may be used.

As the temperature prediction data, about each of preliminarily set plural reference rotational speeds N0, N1 . . . of the rotary electric machine, a temperature prediction data of reference speed in which a relationship among the torque information, the temperature Tmp(t0) of the rotary electric machine at the reference time point t0, and the temperature Tmp(t0+Δt) of the rotary electric machine after lapse of the estimation calculation period Δt from the reference time point t0 is preliminarily set is provided. Then, from the plural temperature prediction data of reference speed provided corresponding to each of the plural reference rotational speeds N0, N1 . . . , the temperature estimation unit 33 selects the temperature prediction data of reference speed corresponding to the present rotational speed N. Then, by referring to the selected temperature prediction data of reference speed, the temperature estimation unit 33 calculates the estimation value Tmp(n) of temperature at the present calculation timing corresponding to the present torque information and the estimation value Tmp(n−1) of temperature calculated at the last time calculation timing.

In the present embodiment, as shown in FIG. 10, the temperature prediction data of reference speed of each reference rotational speed is a map data in which the torque load rate Tload and the temperature Tmp(t0) at the reference time point are set as the map axes. The grid points of the map axis of the torque load rate Tload and the grid points of the map axis of the temperature Tmp(t0) at the reference time point are set by a prescribed interval, respectively. At each intersection point between each grid point of the map axis of the torque load rate Tload and each grid point of the map axis of the temperature Tmp(t0) at the reference time point, a corresponding value of the temperature Tmp(t0+Δt) of the rotary electric machine after lapse of the estimation calculation period Δt from the reference time point t0 is set.

In the present embodiment, the seven reference rotational speeds N0, N1, . . . N6 are provided, the interval of the map axis of the torque load rate Tload is set to 20%, and the interval of the map axis of the temperature Tmp(t0) at the reference time point is set to 20° C.

Using the four temperatures Tmp(t0+Δt) set at each intersection point of four grid points close to the present torque load rate Tload and the estimation value Tmp(n−1) of temperature at the last time calculation timing, the temperature estimation unit 33 performs a well-known linear interpolation of map data (or a high order interpolation), and calculates the estimation value Tmp(n) of temperature at the present calculation timing.

By referring the two temperature prediction data close to the present rotational speed N, the temperature estimation unit 33 calculates the two estimation values Tmp(n) of temperature at the present calculation timing corresponding to the present torque load rate Tload and the estimation value Tmp(n−1) of temperature at the last time calculation timing; and calculates the final estimation value Tmp(n) of temperature at the present calculation timing by performing the linear interpolation (or the high order interpolation) of the two estimation values Tmp(n) of temperature at the present calculation timing.

According to this configuration, by the simple configuration which provides the three-dimensional map data about each of plural reference rotational speeds, the whole region of the operating points can be covered.

Processing of the temperature estimation unit 33 is performed at every estimation calculation period Δt. As shown in FIG. 4, as mentioned above, by referring to the maximum torque data, the temperature estimation unit 33 calculates the maximum torque Tmax corresponding to the present rotational speed N. Then, the temperature estimation unit 33 calculates the torque load rate Tload by dividing the present torque T (in this example, the torque command value To) by the maximum torque Tmax. Then, by referring the temperature prediction data, the temperature estimation unit 33 calculates the estimation value Tmp(n) of temperature at the present calculation timing corresponding to the present rotational speed N, the present torque load rate Tload, and the estimation value Tmp(n−1) of temperature at the last time calculation timing. The temperature estimation unit 33 stores the estimation value Tmp(n) of temperature at the present calculation timing to RAM or the like; and uses it at the next calculation timing, as the estimation value Tmp(n−1) of temperature at the last time calculation timing.

As the present rotational speed N and the present torque information, the instantaneous values at the calculation timing may be used, or the moving average values may be used. As the temperature Tmp(t0+Δt) after lapse of the estimation calculation period Δt from the reference time point t0 which is set in the temperature prediction data, a change amount ΔTmp of temperature from the temperature Tmp(t0) at the reference time point t0 may be set. In this case, the estimation value Tmp(n) of temperature at the present calculation timing is calculated by adding the change amount ΔTmp of temperature calculated with reference to the temperature prediction data, to the estimation value Tmp(n−1) of temperature at the last time calculation timing (Tmp(n)=Tmp(n−1)+ΔTmp).

1-3-4. Output Limitation Unit 34

Figure 11:
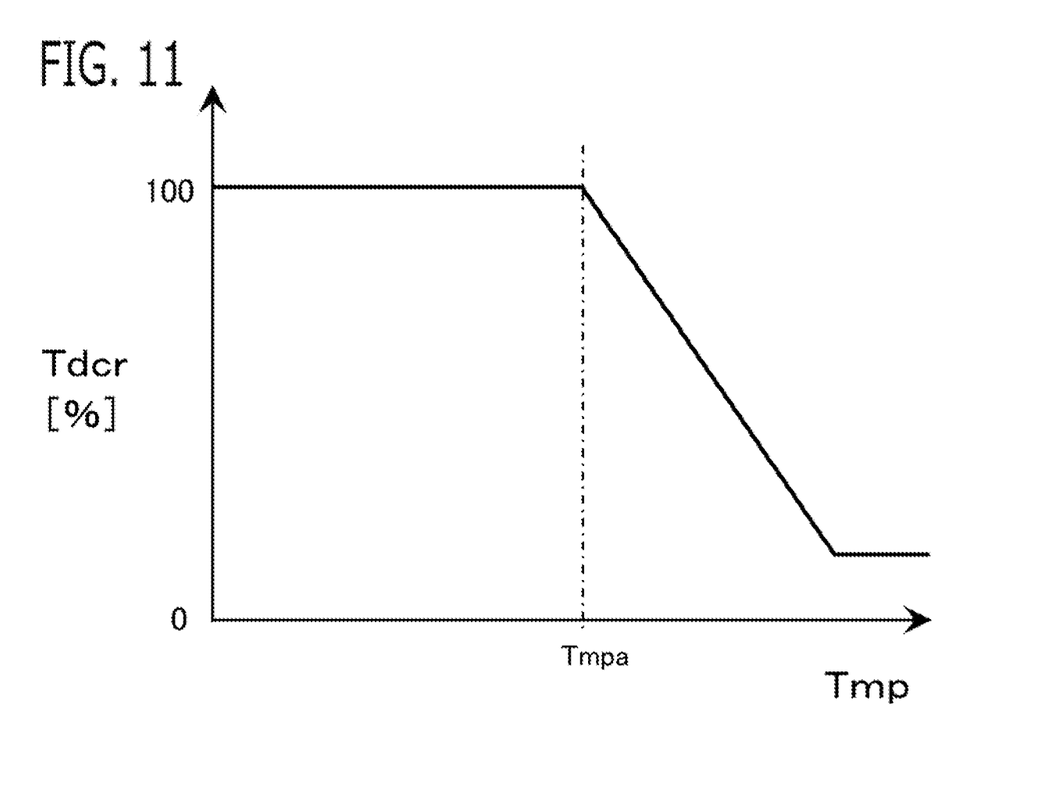
FIG. 11 is a figure for explaining setting of the torque reduction rate according to the estimation value of temperature according to Embodiment 1.

The output limitation unit 34 performs an output limitation of the rotary electric machine, when the estimation value Tmp(n) of temperature exceeds a threshold value temperature Tmpa. For example, by referring to a torque reduction rate data in which a relationship between the estimation value Tmp of temperature and the torque reduction rate Tdcr is preliminarily set as shown in FIG. 11, the output limitation unit 34 calculates the torque reduction rate Tdcr corresponding to the present estimation value Tmp(n) of temperature. As shown in FIG. 11, when the estimation value Tmp of temperature is less than or equal to the threshold value temperature Tmpa, the torque reduction rate Tdcr is set to 100%. And, as the estimation value Tmp of temperature increases from the threshold value temperature Tmpa, the torque reduction rate Tdcr is decreased gradually from 100%. Alternatively, when the estimation value Tmp(n) of temperature exceeds the threshold value temperature Tmpa, the output limitation unit 34 may decrease the torque reduction rate Tdcr gradually; and when the estimation value Tmp(n) of temperature is less than the threshold value temperature Tmpa, the output limitation unit 34 may increase the torque reduction rate Tdcr gradually.

The output limitation unit 34 sets the final torque command value To to a value obtained by multiplying the torque reduction rate Tdcr to the torque command value To. By performing the output limitation, the temperature of the rotary electric machine can be suppressed from rising too much, and the failure due to the temperature rise can be suppressed.

<Estimation of Plural Parts>

In the above embodiment, the temperature of one part (the coil of the stator, or the magnet of the rotor) of the rotary electric machine is estimated. However, as the part of the rotary electric machine whose temperature is estimated, plural parts of the rotary electric machine may be set, and the temperature prediction data may be provided about each of the plural part of the rotary electric machine. Then, about each of the plural parts of the rotary electric machine, by referring the temperature prediction data of the corresponding part of the rotary electric machine, the temperature estimation unit 33 may calculate the estimation value of temperature of the corresponding part of the rotary electric machine.

Then, when any of the estimation values of temperature of the plural parts exceeds a threshold value temperature preliminarily set about each part, the output limitation unit 34 may perform the output limitation of the rotary electric machine. The torque reduction rate data may be provided about each of the plural parts; about each of the plural parts, by referring the torque reduction rate data of the corresponding part, the output limitation unit 34 may calculate the torque reduction rate of each part, based on the estimation value of temperature of the corresponding part; and the output limitation unit 34 may calculate the smallest torque reduction rate among the torque reduction rates of the plural parts, as the final torque reduction rate.

As the plural parts of the rotary electric machine, plural parts which need the monitoring of temperature rise are set. For example, as the plural parts of the rotary electric machine, plural parts of the coil of the stator may be set; as the plural parts of the rotary electric machine, plural parts of the magnet of the rotor may be set; or as the plural parts of the rotary electric machine, one or plural parts of the coil of the stator, and one or plural parts of the magnet of the rotor may be set.

<Temperature Prediction Data>

As the temperature prediction data, about each of preliminarily set plural reference torque information of the rotary electric machine, a temperature prediction data of reference torque in which a relationship among the rotational speed N, the temperature Tmp(t0) of the rotary electric machine at the reference time point t0, and the temperature Tmp(t0+Δt) of the rotary electric machine after lapse of the estimation calculation period Δt from the reference time point t0 is preliminarily set may be provided. Then, the temperature estimation unit 33 selects the temperature prediction data of reference torque corresponding to the present torque information, from the plural temperature prediction data of reference torque provided corresponding to each of the plural reference torque information; and by referring the selected temperature prediction data of reference torque, the temperature estimation unit 33 may calculate the estimation value Tmp(n) of temperature at the present calculation timing corresponding to the present rotational speed N and the estimation value Tmp(n−1) of temperature calculated at the last time calculation timing.

As the temperature prediction data, a high order function data, such as a neural network in which the rotational speed N, the torque information, and the temperature at the reference time point are set as input variables, and the temperature of the rotary electric machine after lapse of the estimation calculation period Δt from the reference time point is set as output variable, may be used.

2. Embodiment 2

The controller 30 according to Embodiment 2 will be explained. The explanation for constituent parts the same as those in Embodiment 1 will be omitted. The basic configuration of the rotary electric machine 1 and the controller 30 according to the present embodiment is the same as that of Embodiment 1. Embodiment 2 is different from Embodiment 1 in that the temperature prediction data is changed according to the state of the cooling mechanism.

As explained in Embodiment 1, various kinds of cooling mechanisms are used for the cooling mechanism of the rotary electric machine 1. For example, the oil cooling type that cooling oil is supplied in the housing and the stator and the rotor are cooled, the water cooling type that the housing and the stator are cooled by cooling water, or the air cooling type that the stator and the rotor are cooled by cooling air is used.

Since the heat radiation amount changes when the flow rate of the refrigerant, such as the cooling oil, the cooling water, or the cooling air, and the temperature of the refrigerant change, the behavior of temperature changes even in the same operating point of the rotational speed N and the torque T.

Then, in the present embodiment, about each of preliminarily set plural reference states of the cooling mechanism of the rotary electric machine, the temperature prediction data is provided. The temperature estimation unit 33 selects the temperature prediction data corresponding to the present state of the cooling mechanism of the rotary electric machine, from the plural temperature prediction data. Then, by referring to the selected temperature prediction data, the temperature estimation unit 33 calculates the estimation value Tmp(n) of temperature after lapse of the estimation calculation period Δt from the last time calculation timing corresponding to the present rotational speed N, the present torque information, and the estimation value Tmp(n−1) of temperature of the rotary electric machine calculated at the last time calculation timing.

According to this configuration, even when the state of the cooling mechanism changes, and the behavior of temperature changes due to the change of the heat radiation amount, since the temperature prediction data corresponding to the present state of the cooling mechanism is selected and referred from the plural temperature prediction data which are set corresponding to the plural states of the cooling mechanism, the temperature can be estimated with good accuracy.

The temperature estimation unit 33 detects one or both of the temperature of the refrigerant, and the flow rate of the refrigerant, as the state of the cooling mechanism. For example, the temperature estimation unit 33 detects the temperature of the refrigerant, based on the output signal of the temperature sensor, or the operating state of the radiator. The temperature estimation unit 33 detects the flow rate of the refrigerant, based on the output signal of the flow rate sensor, or the operating state of the refrigerant pump.

For example, as the plural reference states of the cooling mechanism, about each of three reference refrigerant temperatures, the temperature prediction data as shown in FIG. 10 is provided. The temperature estimation unit 33 selects the temperature prediction data close to the present refrigerant temperature from the three temperature prediction data, and calculates the estimation value of temperature by referring the selected temperature prediction data.

3. Embodiment 3

The controller 30 according to Embodiment 3 will be explained. The explanation for constituent parts the same as those in Embodiment 1 will be omitted. The basic configuration of the rotary electric machine 1 and the controller 30 according to the present embodiment is the same as that of Embodiment 1. Embodiment 3 is different from Embodiment 1 in that the temperature prediction data is changed according to the DC voltage Vdc.

Figure 12:
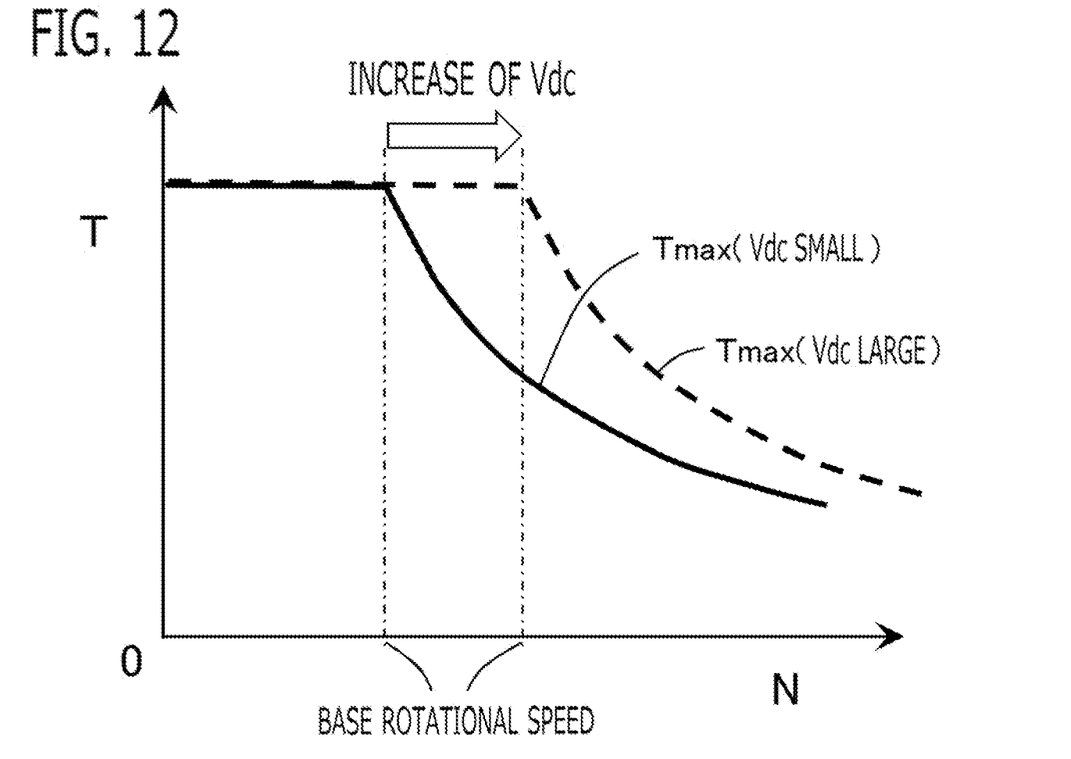
FIG. 12 is a figure for explaining change of the maximum torque according to the DC voltage according to Embodiment 3.

If the DC-DC converter and the like is provided in the DC power source 3, and the DC voltage Vdc supplied to the inverter 4 is variable, or if the charging state of the battery drops and the DC voltage Vdc supplied to the inverter 4 from the battery drops, the control of the torque control unit 32 is changed according to the change of the DC voltage Vdc. As shown in FIG. 12, as the DC voltage Vdc increases, since the base rotational speed in which the induced voltage reaches the DC voltage Vdc increases, the curve of the maximum torque Tmax shifts to the increase side of the rotational speed N.

In the region where the rotational speed N is greater than or equal to the base rotational speed, when the DC voltage Vdc changes, even in the operating point of the same rotational speed N and the same torque T, the dq-axis currents change by the magnetic flux weakening control and the like, and the copper loss and the iron loss change. Even in the region where the rotational speed N is less than or equal to the base rotational speed, when the DC voltage Vdc changes, even in the operating point of the same rotational speed N and the same torque T, the ON period of PWM control changes, the magnitude of the harmonic wave component of current changes, and the iron loss and the copper loss change. Therefore, even in the operating point of the same rotational speed N and the same torque T, when the DC voltage Vdc changes, the heating amount of each part of the rotary electric machine, such as the stator coil, the stator core, and the rotor core, changes, and the behavior of temperature changes.

Then, in the present embodiment, about each of preliminarily set plural reference DC voltages of the DC power source 3, the temperature prediction data is provided. The temperature estimation unit 33 selects the temperature prediction data corresponding to the present DC voltage Vdc, from the plural temperature prediction data. Then, by referring to the selected temperature prediction data, the temperature estimation unit 33 calculates the estimation value Tmp(n) of temperature after lapse of the estimation calculation period Δt from the last time calculation timing corresponding to the present rotational speed N, the present torque information, and the estimation value Tmp(n−1) of temperature of the rotary electric machine calculated at the last time calculation timing.

According to this configuration, even when the DC voltage Vdc changes, and the behavior of temperature changes by the change of the heating amount due to the copper loss and the iron loss, since the temperature prediction data corresponding to the present DC voltage Vdc is selected and referred from the plural temperature prediction data which are set corresponding to the plural DC voltages Vdc, temperature can be estimated with good accuracy.

For example, as the plural reference DC voltages, about each of the two reference DC voltages, the temperature prediction data as shown in FIG. 10 is provided. The temperature estimation unit 33 selects the temperature prediction data close to the present DC voltage Vdc detected by the voltage sensor 6, from the two temperature prediction data, and calculates the estimation value of temperature by referring to the selected temperature prediction data.

Embodiments 2 and 3 may be performed at the same time. As the temperature prediction data, about each of plural combinations which combines the preliminarily set plural reference rotational speeds and the preliminarily set plural reference DC voltages, the temperature prediction data may be provided. Then, the temperature estimation unit 33 may select the temperature prediction data of combination corresponding to the present rotational speed N and the present DC voltage Vdc, from the plural temperature prediction data, and may calculate the estimation value of temperature by referring to the selected temperature prediction data.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A controller for a rotary electric machine, the controller comprising:
at least one memory that stores a temperature prediction data in which a relationship among a rotational speed of a rotary electric machine, a torque information of the rotary electric machine, a temperature of the rotary electric machine at a reference time point, and a temperature of the rotary electric machine after an estimation calculation period elapses from the reference time point, and
at least one processor that, at every the estimation calculation period, sets the last calculation time before the estimation calculation period as the reference time point, and, by referring to the temperature prediction data, calculates an estimation value of temperature of the rotary electric machine after the estimation calculation period elapses from the last calculation time, corresponding to the present rotational speed of the rotary electric machine, the present torque information of the rotary electric machine, and the estimation value of temperature of the rotary electric machine calculated at the last calculation time.

2. The controller for rotary electric machine according to claim 1,
wherein as a part of the rotary electric machine whose temperature is estimated, plural parts of the rotary electric machine are set,
wherein the temperature prediction data is provided for each of the plural parts of the rotary electric machine, and
wherein about each of the plural parts of the rotary electric machine, by referring to the temperature prediction data of the corresponding part of the rotary electric machine, the at least one processor calculates the estimation value of temperature of the corresponding part of the rotary electric machine.

3. The controller according to claim 1, wherein as a part of the rotary electric machine whose temperature is estimated, a coil provided in a stator of the rotary electric machine is set.

4. The controller according to claim 1, as a part of the rotary electric machine whose temperature is estimated, a magnet provided in a rotor of the rotary electric machine is set.

5. The controller according to claim 1, wherein when the estimation value of temperature of the rotary electric machine exceeds a threshold value temperature, the at least one processor performs an output limitation of the rotary electric machine.

6. The controller according to claim 1, wherein as the torque information of the rotary electric machine, a torque load rate which is a ratio of a torque of the rotary electric machine with respect to a maximum torque capable of being outputted in the corresponding rotational speed of the rotary electric machine is used.

7. The controller according to claim 1,
wherein as the temperature prediction data, about each of preliminarily set plural reference rotational speeds of the rotary electric machine, a temperature prediction data of reference speed in which a relationship among the torque information of the rotary electric machine, the temperature of the rotary electric machine at the reference time point, and the temperature of the rotary electric machine after the estimation calculation period elapses from the reference time point is preliminarily set is provided, and
wherein from the plural temperature prediction data of reference speed provided corresponding to each of the plural reference rotational speeds of the rotary electric machine, the at least one processor selects the temperature prediction data of reference speed corresponding to the present rotational speed of the rotary electric machine; and
by referring to the selected temperature prediction data of reference speed, the at least one processor calculates the estimation value of temperature of the rotary electric machine after the estimation calculation period elapses from the last calculation time, corresponding to the present torque information of the rotary electric machine, and the estimation value of temperature of the rotary electric machine calculated at the last calculation time.

8. The controller according to claim 1,
wherein about each of preliminarily set plural reference states of a cooling mechanism of the rotary electric machine, the temperature prediction data is provided, and
wherein from the plural temperature prediction data, the at least one processor selects the temperature prediction data corresponding to the present state of the cooling mechanism of the rotary electric machine; and
by referring to the selected temperature prediction data, the at least one processor calculates the estimation value of temperature of the rotary electric machine after the estimation calculation period elapses from the last calculation time, corresponding to the present rotational speed of the rotary electric machine, the present torque information of the rotary electric machine, and the estimation value of temperature of the rotary electric machine calculated at the last calculation time.

9. The controller according to claim 1, wherein about each of preliminarily set plural reference DC voltages of a DC power source which supplies DC power to the rotary electric machine, the temperature prediction data is provided, and wherein from the plural temperature prediction data, the at least one processor selects the temperature prediction data corresponding to the present DC voltage; and by referring to the selected temperature prediction data, the at least one processor calculates the estimation value of temperature of the rotary electric machine after the estimation calculation period elapses from the last calculation time, corresponding to the present rotational speed of the rotary electric machine, the present torque information of the rotary electric machine, and the estimation value of temperature of the rotary electric machine calculated at the last calculation time.

\* \* \* \* \*